W. M. & J. B. Ellis,

Flue and Tubular Boiler.

No. 1,637. Reissued Mar. 15, 1864.

Witnesses:
J. Smith
S. Glover

Inventor:
Wm. M. Ellis
James B. Ellis
by Atty Thos. T. Everett

N. PETERS, PHOTO-LITHOGRAPHER, WASHINGTON, D. C.

UNITED STATES PATENT OFFICE.

WM. M. ELLIS AND JONAS B. ELLIS, OF WASHINGTON, D. C.

IMPROVEMENT IN STEAM-BOILERS.

Specification forming part of Letters Patent No. 36,288, dated August 26, 1862; Reissue No. 1,637, dated March 15, 1864.

DIVISION B.

*To all whom it may concern:*

Be it known that we, WILLIAM M. ELLIS and JONAS B. ELLIS, of the city of Washington, in the District of Columbia, have invented a certain new and useful Improvement in Steam-Boilers; and we do hereby declare that the following is a full, clear, and exact description thereof, reference being had to the accompanying drawings, and to the letters and marks thereon.

In the horizontal tubular steam boiler where the tubes are fire-tubes there is a tendency to "priming." One of the causes of this tendency arises from the disposition of the heat and the products of combustion to pass up from the fire-box or from the rear chamber in the return-flue boiler to the upper row or series of tubes, so that the largest amount of heat passes into the upper portion of the water in the boiler.

Our invention relates to means for remedying this tendency to priming and for equalizing and giving a due distribution of the heat and the products of combustion.

Figure 1:
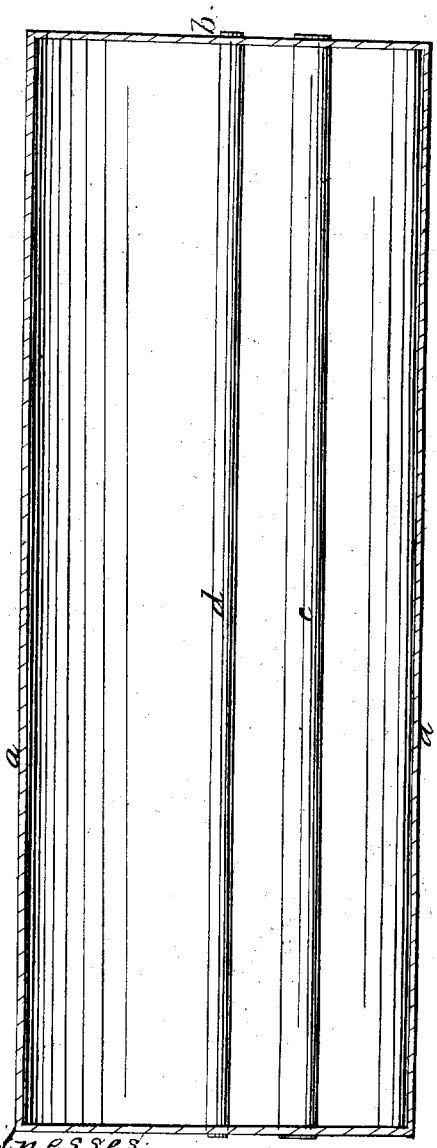
Figure 2:
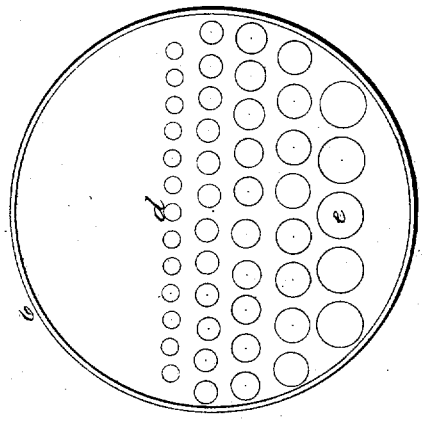

Figure 1 of the drawings, forming part of this specification, is a view by longitudinal section of a horizontal cylindrical tubular boiler; and Fig. 2 a view of the end of such boiler.

In each of these figures where like parts are shown like letters and marks are used to indicate the parts.

The shell of the boiler is marked *a*, the ends *b*, and the tubes *c* and *d*. In order to prevent the products of combustion from following the natural track—*i. e.*, passing freely into and through the series of the upper tubes, as boilers are commonly constructed and as they would were the tubes throughout of the same area—we make the tubes of a gradually-decreasing area from the upper to the lower tubes, and thus interrupt the course of the heat and products, forcing them to pass to a greater degree than they otherwise would to the lower tubes, which, being of greater area, the more readily admit the heat and products of combustion. The heat is therefore more regularly and equally disposed of throughout the water, and the tendency to free and more rapid ebullition, comparatively, near the surface of the water prevented.

The advantages derived from this improvement will accrue in all boilers of horizontal fire-tubes, whether direct or return.

The principal advantage of this arrangement is the more equal and perfect distribution of the heat over the tube-surface of all forms of tubular boilers. It is a well-known fact that the tendency of heat is to rise to the highest point of exit in all boilers. The object of this improvement is to counteract such tendency and to compel a distribution of the heat as nearly equal as possible on the whole of the tube-surface exposed, which will result in a much greater evaporation efficiency in any tubular boiler, or by a reduction of tube-surface equal evaporation results may be obtained by the same consumption of fuel, as it is believed and thought will be ascertained by experiment that at least twenty-five cent. of tubular surface in all tubular boilers, where the heat passes through the tubes as at present arranged, is comparatively lost in absorbing the heat of the furnace and is passed off through the upper rows of tubes to the smoke-stack or chimney.

What we claim as our invention, and desire to secure by Letters Patent, is—

Gradually increasing the area of the tubes from the highest to the lowest tubes, as herein described.

This specification signed this 12th day of February, 1864.

WM. M. ELLIS,
J. B. ELLIS.

Witnesses:
J. D. CLARK,
W. A. BOSS.